US009515687B2

(12) United States Patent
Hewavithana et al.

(10) Patent No.: US 9,515,687 B2
(45) Date of Patent: Dec. 6, 2016

(54) INTER CARRIER INTERFERENCE CANCELLATION FOR ORTHOGONAL FREQUENCY DOMAIN MULTIPLEXING RECEIVERS

(75) Inventors: Thushara Hewavithana, Hertfordshire (GB); Parveen K. Shukla, Nottingham (GB); Bernard Arambepola, Enfield (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,694

(22) PCT Filed: Nov. 18, 2011

(86) PCT No.: PCT/US2011/061405
§ 371 (c)(1),
(2), (4) Date: Jun. 19, 2013

(87) PCT Pub. No.: WO2013/074119
PCT Pub. Date: May 23, 2013

(65) Prior Publication Data
US 2013/0272460 A1  Oct. 17, 2013

(51) Int. Cl.
| H04L 27/26 | (2006.01) |
| H04B 1/10 | (2006.01) |
| H04L 1/00 | (2006.01) |
| H04L 25/02 | (2006.01) |
| H04L 25/03 | (2006.01) |

(52) U.S. Cl.
CPC .............. *H04B 1/10* (2013.01); *H04L 1/005* (2013.01); *H04L 25/03821* (2013.01); *H04L 27/2647* (2013.01); *H04L 25/022* (2013.01); *H04L 25/03159* (2013.01)

(58) Field of Classification Search
CPC ............. H04L 25/03821; H04L 1/005; H04L 25/022; H04L 25/03159; H04L 27/2647; H04L 2025/03414; H04B 1/10
USPC .......................................... 375/260, 346, 350
See application file for complete search history.

(56) References Cited

U.S. PATENT DOCUMENTS 5,886,749 A * 3/1999 Williams et al. ............. 348/614
6,252,961 B1 * 6/2001 Hogan ............................ 380/37
7,006,565 B1 * 2/2006 Endres et al. ................. 375/233

(Continued)

FOREIGN PATENT DOCUMENTS

WO   2013/074119 A1   5/2013

OTHER PUBLICATIONS

International Search Report and Written Opinion received for PCT Patent Application No. PCT/US2011/061405, mailed on May 29, 2012, 9 pages.

(Continued)

*Primary Examiner* — David B. Lugo
(74) *Attorney, Agent, or Firm* — Forefront IP Lawgroup, PLLC

(57) ABSTRACT

Apparatus and methods are described to perform inter carrier interference (ICI) reduction or cancellation in an orthogonal frequency domain multiplexing (OFDM) receiver. A first and a second stage of ICI cancellation may be performed before inputting an estimated transmitted data carrier for forward error correction. Forward error correction may include a signal re-correction and reconstruction of the estimated transmitted data carrier prior to a further stage of ICI cancellation.

20 Claims, 7 Drawing Sheets

(56) References Cited

U.S. PATENT DOCUMENTS

| | | | |
|---|---|---|---|
| 8,335,284 B1* | 12/2012 | Lee et al. | 375/346 |
| 2002/0181549 A1* | 12/2002 | Linnartz et al. | 375/260 |
| 2004/0184550 A1* | 9/2004 | Yoshida et al. | 375/260 |
| 2005/0157802 A1* | 7/2005 | Park et al. | 375/260 |
| 2008/0008261 A1 | 1/2008 | Baggen et al. | |
| 2008/0049852 A1 | 2/2008 | Lee | |
| 2009/0060016 A1* | 3/2009 | Liu | 375/229 |
| 2009/0161779 A1 | 6/2009 | Zhidkov et al. | |
| 2009/0268675 A1* | 10/2009 | Choi | 370/329 |
| 2010/0131824 A1* | 5/2010 | Kolze | 714/762 |
| 2011/0021170 A1* | 1/2011 | Kolze et al. | 455/296 |
| 2011/0119320 A1* | 5/2011 | Wu et al. | 708/235 |
| 2011/0211630 A1* | 9/2011 | Nakahara et al. | 375/232 |
| 2014/0010272 A1* | 1/2014 | Ma | H04L 25/0204 375/224 |

OTHER PUBLICATIONS

International Preliminary Report on Patentability and Written Opinion received for PCT Patent Application No. PCT/US2011/061405, mailed on May 30, 2014, 6 pages.

* cited by examiner

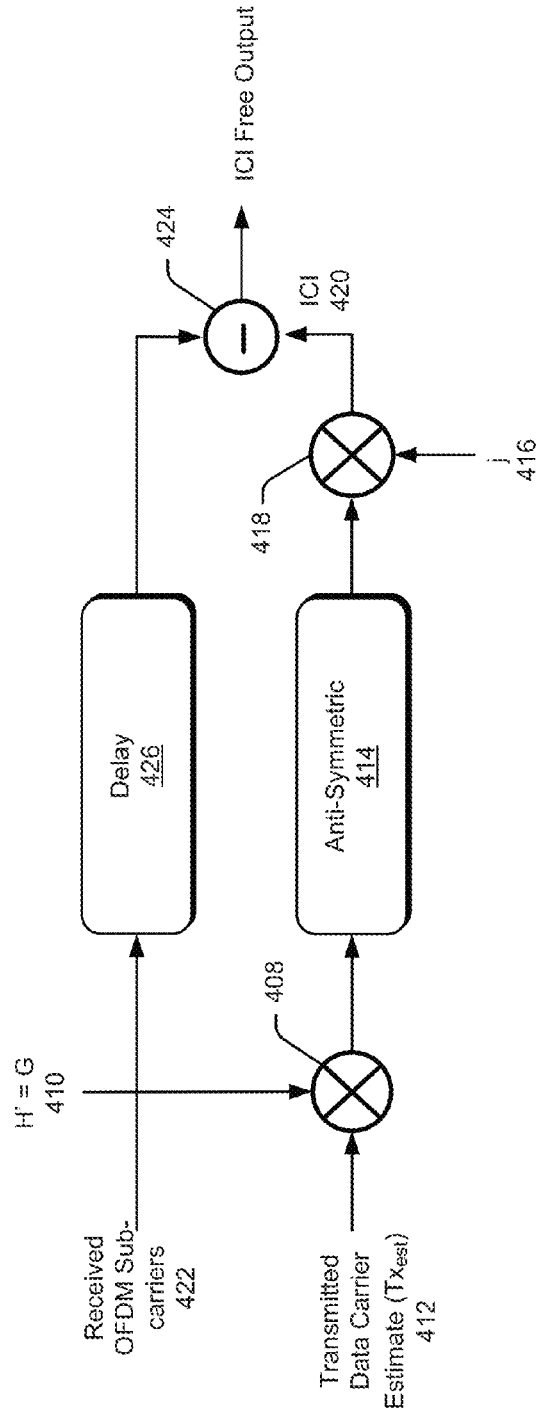

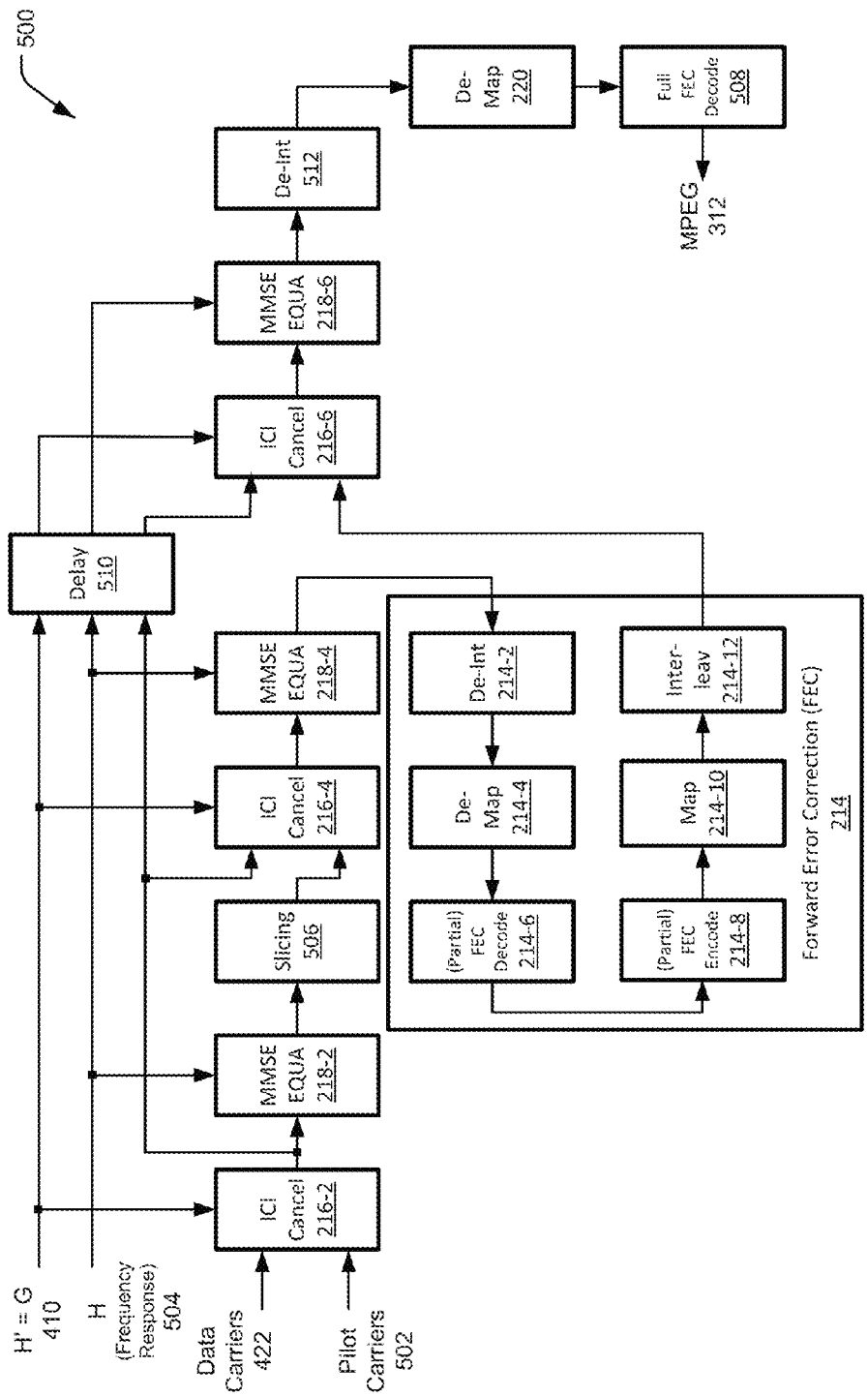

INTER CARRIER INTERFERENCE CANCELLATION FOR ORTHOGONAL FREQUENCY DOMAIN MULTIPLEXING RECEIVERS

BACKGROUND

Digital television (DTV) reception is becoming an important capability requirement for mobile communications (e.g., cell phones, notebook and tablet computers), Terrestrial digital TV broadcasts may employ orthogonal frequency division multiplexing (OFDM) modulation format used in the mobile communications. The terrestrial digital TV broadcasts may include Digital Video Broadcasting Terrestrial $2^{nd}$ Generation Terrestrial (DVB-T2), Integrated Services Digital Broadcasting Terrestrial (ISDB-T), and other standards on terrestrial digital TV broadcasting format.

In an implementation, OFDM may include a modulation format that is an effective measure against selective signal fading. For example, OFDM may include a frequency spectrum that is sub-divided into a large number of orthogonal subcarriers. The orthogonality between subcarriers, however, may partially be lost in the case of moderate or high mobility in higher carrier frequencies. As a result of this loss of orthogonality between subcarriers information may be leaked from one subcarrier to another. Such a leakage or interference between subcarriers is commonly referred to as inter carrier interference (ICI).

ICI may degrade the performance of communication receivers in mobile conditions and may set a limit to the maximum speed at which the receiver can operate reliably. Hence, ICI cancellation algorithms may be used to improve mobile or Doppler performance of such receivers. Such ICI cancellation is a challenge, particularly if the speed of the mobile receiver is high.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

FIGS. 4A and 4B show an exemplary implementation for inter carrier interference (ICI) cancellation that may be implemented repeatedly at the OFDM receiver.

FIG. 5 is a block diagram that implements inter carrier interference (ICI) cancellation algorithm in the OFDM receiver.

DETAILED DESCRIPTION

Overview

Figure 1:
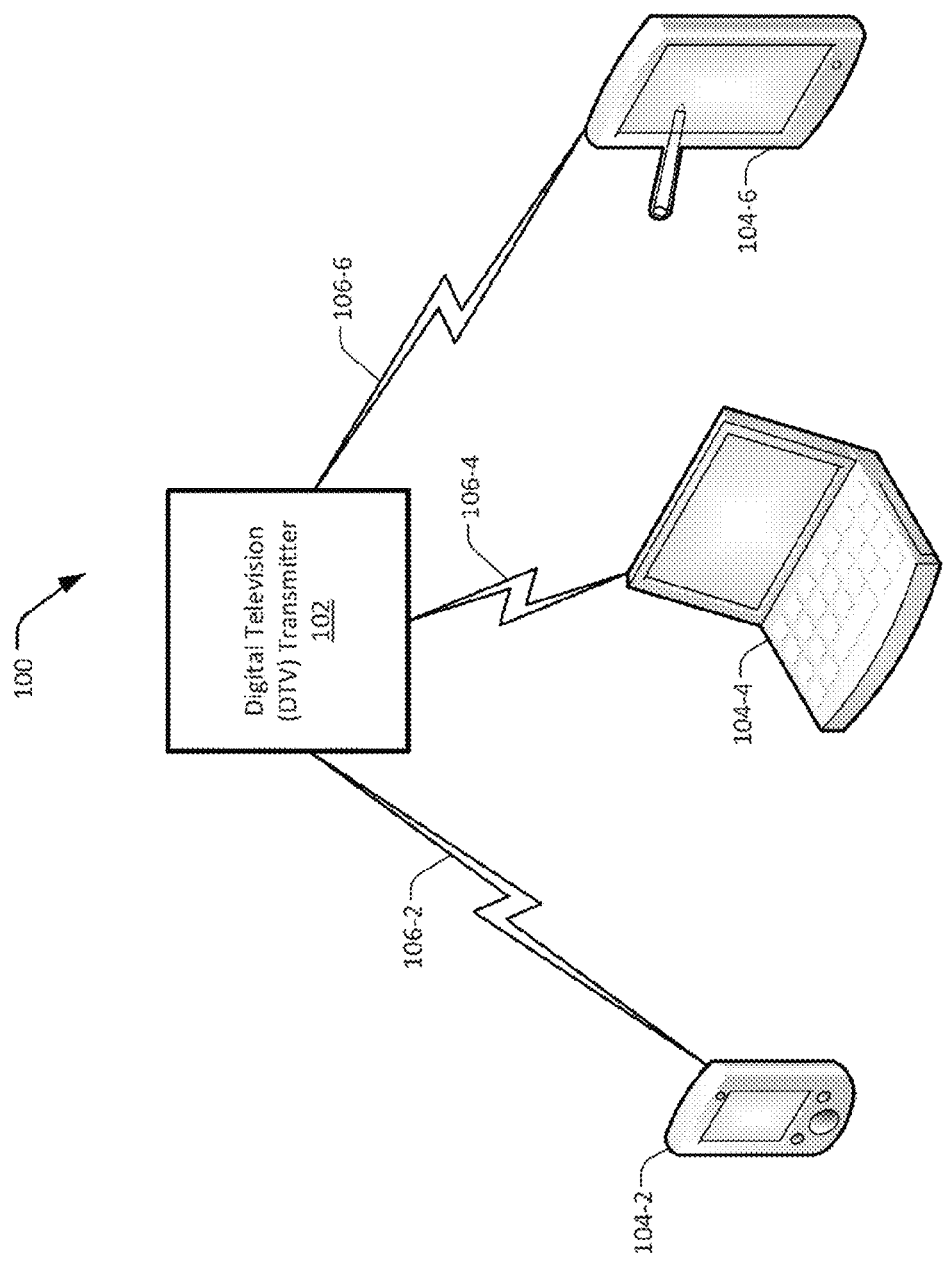
FIG. 1 is a diagram illustrating an example system implementing inter carrier interference (ICI) cancellation for mobile digital television (DTV) receivers.

Apparatus and methods are described to perform inter carrier interference (ICI) reduction or cancellation using a forward error correction (FEC) feedback. In particular, Doppler performance may be improved for receivers that employ orthogonal frequency division multiplexing (OFDM) modulation format, such as mobile digital television (DTV) receivers. The use of the FEC feedback in the OFDM receivers may enable a demodulator to perform efficient ICI cancellation. For example, an FEC module may include a signal re-correction and reconstruction part for estimating transmitted data carriers of a demodulated data. In this example, the ICI may be removed from the demodulated data of the estimated transmitted data carriers. Further ICI cancellation may be repeated using the FEC module to provide more accurate estimates of the transmitted data carriers. In an implementation, the ICI cancelled demodulated data of the estimated transmitted data carriers may undergo full forward error correcting to improve the Doppler performance in the DTV receivers. Although the present implementations are described with reference to the DTV receivers, the proposed solution is applicable to OFDM receiver designs in general.

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

Some embodiments may be used in conjunction with various devices and systems, for example, a video device, an audio device, an audio-video (A/V) device, a Digital Video Disc (DVD) player, a High Definition (HD) DVD player, a DVD recorder, a HD DVD recorder, a Personal Video Recorder (PVR), a broadcast HID receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments, 802.11ad ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, a Wireless Application Protocol (WAP) device, or the like.

Some embodiments may be used in conjunction with one or more types of wireless communication signals and/or systems, for example, Radio Frequency (RF), Wi-Fi, Wi-Max, Ultra-Wideband (UWB), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Example System

FIG. 1 shows a system-level overview of an example system environment 100 for implementing ICI cancellation in OFDM receivers, such as DTV mobile devices. With current developments in electronic and communications technologies, digital technologies have been introduced and employed into the field of broadcasting systems and standards. For example, OFDM schemes have been widely applied to digital transmission technologies, such as digital audio broadcast (DAB), DTV, WLAN, digital video broadcasting—terrestrial (DVB-T), digital multimedia broadcasting—terrestrial (DMB-T), worldwide interoperability for microwave access (WiMAX) and the like. In an implementation, the system environment 100 may include a DTV transmitter 102 that transmits digital audio and video signals. The DTV transmitter 102 may include a regular cellular network base station, a regular high definition TV transmitter, or other digital transmitters used in wireless communications. In an implementation, the transmitted audio and video signals may be transmitted using an OFDM scheme that employs orthogonal multi-carriers (i.e., orthogonal sub-carriers). The OFDM scheme may a) convert data symbols input, which are in series, into parallel data symbols, b) modulate each of the parallel data symbols into plurality of OFDM sub-carriers, and c) may transmit the modulated plurality of OFDM sub-carriers that includes the transmitted data symbols. At the other end, receiver devices 104 that include OFDM receivers may receive data carriers that include the modulated plurality of OFDM sub-carriers. The receiver devices 104 may include mobile cellular phone 104-2, laptop 104-4, and personal digital assistant (PDA) 104-6. Furthermore, the receiver devices 104 may be understood to include other devices that implement OFDM receiving capabilities.

In an implementation, the receiver devices 104 may employ algorithms to perform ICI cancellation using a feedback from an FEC module. The FEC module may include signal reconstruction for more efficient demodulation at the receiver devices 104. In another implementation, the receiver devices may connect with the DTV transmitter 102 using wireless connection 106. Traffic or traffic streams are sent through the wireless connection 106. In addition, the wireless connection 106 may be a directed or beam formed link between the DTV transmitter 102 and the receiver devices 104.

Example Device

Figure 2:
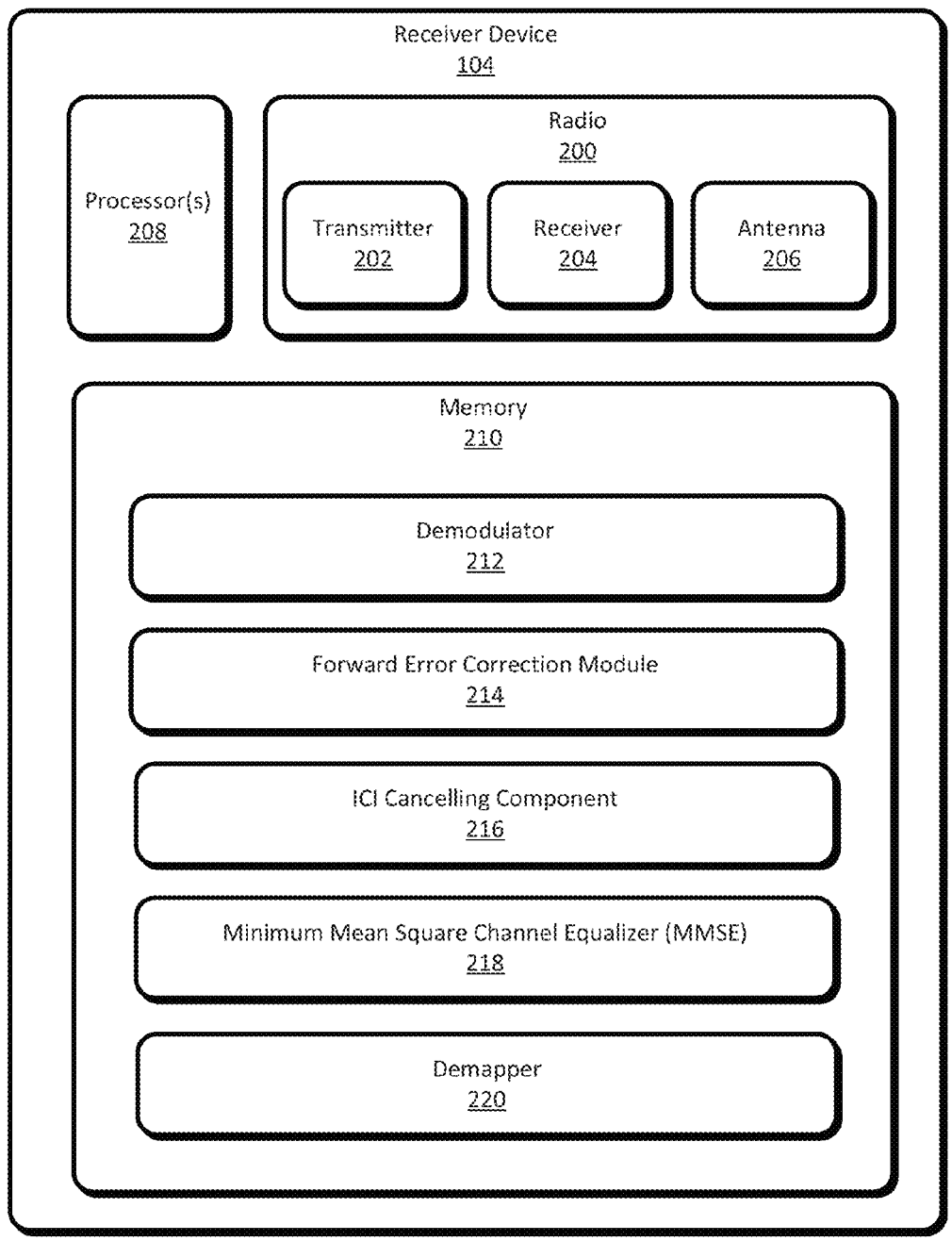
FIG. 2 is a block diagram of an example receiver device that implements inter carrier interference (ICI) cancellation algorithm.

FIG. 2 is a block diagram of the receiver device 104 that implements ICI cancellation on the received data carriers. The receiver device 104 may include a radio 200 that includes a transmitter 202, a receiver 204 and one or more antenna 206. In certain implementations, the radio 200 may be based on the IEEE 802.11 standards.

The receiver device 104 includes one or more processor(s) 208. Processor(s) 208 may be a single processing unit or a number of processing units, all of which may include single or multiple computing units or multiple cores. The processor(s) 208 may be implemented as one or more microprocessors, microcomputers, microcontrollers, digital signal processors, central processing units, state machines, logic circuitries, and/or any devices that manipulate signals based on operational instructions. Among other capabilities, the processor(s) 208 may be configured to fetch and execute computer-readable instructions or processor-accessible instructions stored in a memory 210 or other computer-readable storage media.

In an implementation, the processor(s) 208 may process the received modulated plurality of OFDM sub-carriers (i.e., OFDM sub-carriers) that include ICI due to reflections and noise during transmission. The OFDM sub-carriers may be demodulated by a demodulator 212 to create a demodulated data. The demodulated data may be forward error corrected by forward error correction (FEC) module 214. As further discussed below, the FEC module 214 may include reconstructing estimates of transmitted OFDM sub-carriers for ICI cancellation. In other words, the FEC module 214 may be used as a feedback to further stage of the ICI cancellation. The ICI cancellation may be performed by an ICI cancelling component 216 to create an ICI cancelled demodulated data. Further, a minimum mean square channel equalizer (MMSE) 218 may be used to equalize the ICI cancelled demodulated data. A demapper 220 may demap the equalized ICI cancelled demodulated data before another stage of forward error correction may be performed to provide improved estimates of the transmitted OFDM sub-carriers (i.e., better signal quality reception).

In certain implementations, the memory component 210 is an example of computer-readable storage media for storing instructions which are executed by the processor(s) 208 to perform the various functions described above. For example, memory 210 may generally include both volatile memory and non-volatile memory (e.g., RAM, ROM, or the like). Memory 210 may be referred to as memory or computer-readable storage media herein. Memory 210 is capable of storing computer-readable, processor-executable program instructions as computer program code that may be executed by the processor(s) 210 as a particular machine configured for carrying out the operations and functions described in the implementations herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium that can be used to store information for access by a computing device.

Figure 3:
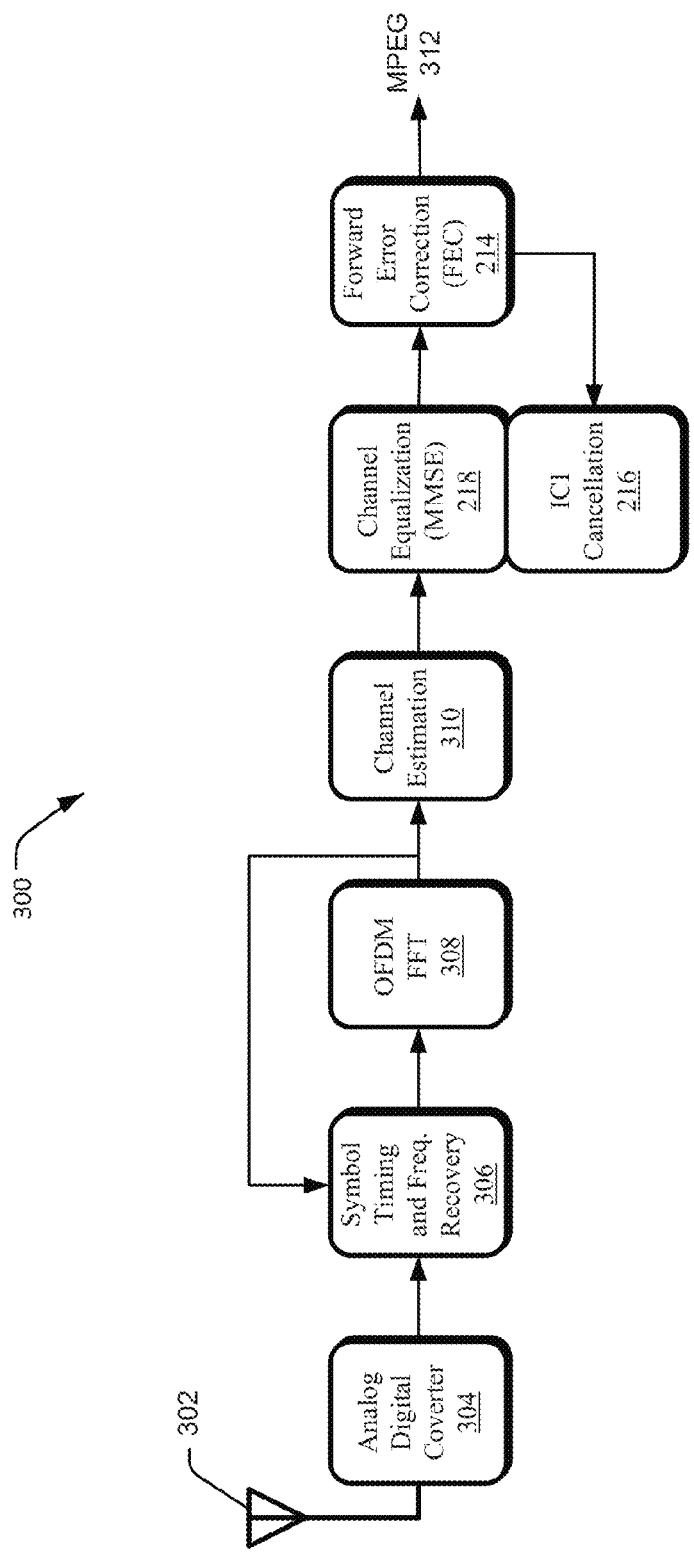
FIG. 3 is a block diagram of a digital television (DTV) receiver architecture for implementing inter carrier interference (ICI) cancellation using a feedback from a forward error correction (FEC) module in an OFDM receiver.

FIG. 3 is a block diagram of a digital television (DTV) receiver architecture 300 for implementing the ICI cancellation in the receiver device 104. In an implementation, the DTV receiver architecture 300 illustrates an OFDM based DTV receiver. In particular, an antenna 302 (i.e., antenna 206) may receive signals that are transformed into baseband signals by filtering components (not shown). The baseband signals may be sampled and digitized using analog to digital converter (ADC) component 304. The ADC component 304 may sample and digitize the signals into a sequence of samples. The sequence of samples may be digitally filtered to remove adjacent channel interference. Further, re-sampling of the signal may be performed at natural OFDM sample rate and to enable correct implementation of an OFDM Fast Fourier Transform operation. In certain implementations, an OFDM symbol and frequency timing may be recovered using symbol timing and frequency recovery 306. For example, the symbol timing may include synchronization information, while frequency recovery may include sub-carrier frequency information.

In an implementation, OFDM Fast Fourier Transform (FFT) 308 may further process the output of the symbol timing and frequency recovery 306. In the OFDM scheme, signal (e.g., data) transmission using the orthogonal sub-carriers may be efficiently implemented using an inverse FFT (IFFT). Similarly, the OFDM FFT 308 may be employed at the receiving end to efficiently demodulate the signals transmitted. In certain implementations, the output of the OFDM FFT 308 may be further processed to calculate time and frequency errors to be fed back to symbol timing and frequency recovery 306 to improve the OFDM symbol and frequency timing recovery.

In an implementation, channel estimation 310 may use pilot carriers inserted into the transmitted data symbols in order for the OFDM receiver to estimate transmission channels at the sub-carrier frequencies. The channel estimate may include determination of channel frequency response "H." After channel estimation, channel equalization (MMSE) 218 may be employed such that frequency domain attributes of the transmitted signal may be faithfully reproduced. The MMSE 218 may use the channel frequency response "H" during the equalization. In other implementations, an ICI cancellation 216 may be integrated with the process of equalization in the MMSE 218. The ICI cancellation 216 may receive a feedback from the FEC 214. In an implementation, the FEC 214 may include re-correction and reconstruction of the estimated transmitted signals to produce more accurate output prior to demodulation. For example, the accurate output may provide moving picture experts group (MPEG) standard output 312.

FIGS. 4A and 4B show an exemplary implementation for ICI cancellation that may be implemented repeatedly at the ICI cancellation 216 in FIGS. 2 and 3. As discussed above, the channel frequency response "H" may be estimated prior to equalization. In an implementation, a mathematical representation of the frequency response H in the receiver devices 104 may be time-varying. The time variation may be captured into a Taylor series as, hereinafter referred to as the following Eq. (1):

$$H(t) = H(t)\Big|_{t=0} + t\frac{\partial H(t)}{\partial t}\Big|_{t=0} + O(t^2) \tag{1}$$

In an implementation, H(t) may represent the frequency response for a current symbol at time "t." In the OFDM scheme, H(t) may be computed for each orthogonal sub-carrier (i.e., OFDM sub-carrier) prior to equalization. At the right side of Eq. (1), the first term may include the channel frequency response "H" at time equal to zero. The first term may be present in a static receiver device 104, and may be used as an input to minimum mean square channel equalization (MMSE) component (as further discussed in FIG. 5). In other implementations, dynamic receivers (e.g., mobile cellular phone 104-2) may take into account the higher order components of the Eq. 1. In particular, the second term of the Eq. (1) may give rise to inter-carrier interference (ICI). The second term includes a derivative with respect to time of the channel frequency response "H". For example, the estimate of the channel frequency response of the current symbol and the corresponding estimates of the previous and next symbols may be used to get the time derivative of the channel frequency response "H." In an implementation, the second order component of the Eq. (1) (i.e., $O(t^2)$) may have little impact on performance gains such that, design considerations may set aside the $O(t^2)$ component in the Eq. (1). In other words, the $O(t^2)$ component of the Eq. (1) may be bypassed in the present ICI cancellation because the performance gains is small and hence, may be excluded based on diminishing returns principle.

In FIG. 4A, each item in the Eq. (1) may include a vector of order N, where N is the size of the OFDM FFT 408. For example, if the OFDM FFT 408 size is 8192, then the channel frequency response "H" may have 8192 components (i.e., one component corresponding to each sub-carrier). For the given vector of the order N, an ICI estimate for a specific symbol may be determined by the following Eq. (2).

$$ICI = [T] [H'] [Tx] \tag{2}$$

In an implementation, the ICI estimate defined by the Eq. 2 may be represented in matrix form. For example, FIG. 4A illustrates a transmitted data carrier (Tx) that may include a (N×1) column vector in Tx Carriers 400, The (N×1) column vector may represent the orthogonal sub-carriers in the OFDM scheme. Similarly, the differentiation of the channel frequency response estimate H with respect to time (denoted by H') may include an (N×N) diagonal matrix 402. The (N×N) diagonal matrix may include as diagonal elements the time derivatives of H computed by taking the difference between the channel estimates of the N sub-carriers of successive symbols. The time derivatives computed as differences of the channel estimates between successive symbols may be represented by "$G_1, G_2, \ldots G_N$." In an implementation, the product between the Tx Carriers 400 and the (N×N) diagonal matrix 402 may be an input to the multiplication by a Toeplitz (N×N) matrix 404. The Toeplitz (N×N) matrix 404 may include an (N×N) Toeplitz matrix with zeros in the main diagonal to avoid interference due to the carrier itself. In certain implementations, Toeplitz matrix coefficients may include functions of the OFDM modulation. As such, the Toeplitz matrix coefficients may be pre-computed and stored for purposes of determining the ICI. Finally, an ICI (N×1) column vector 406 may be derived from the output of the multiplication by the Toeplitz matrix 404. The ICI (N×1) vector matrix 406 may include the estimated ICI for each of the N orthogonal sub-carriers.

In an implementation, FIG. 4B illustrates an architecture to implement FIG. 4A. In particular, a multiplier component 408 may receive a first input that includes derivative of the channel frequency response (i.e., H' or G) 410. Further, the multiplier component may receive a second input that includes transmitted data carrier estimate ($Tx_{est}$) 412. The first input G 410 may include the time difference of the channel estimate while the second input $Tx_{est}$ 412 may include the transmitted data carrier estimate. In an implementation, a product output of the multiplier 408 may serve as an input to the multiplication by a Toeplitz matrix (hereinafter referred to as anti-symmetric operation or anti-symmetric 414). The coefficients of the anti-symmetric 414 may include imaginary components of complex values only. To this end, the anti-symmetric 414 may be implemented to have real coefficient values by multiplying the output of the anti-symmetric 414 with "j" 416, which represents $\sqrt{-1}$. The multiplication may be implemented using a multiplier component 418. The output of this multiplier may now represent an estimated value of ICI 420. The ICI 420 may be an implementation of the ICI (N×1) vector matrix 406 in FIG. 4A above. In other implementations, received OFDM sub-carriers 422 may include received signals from which the ICI 420 has to be removed. The removal of the ICI 420 may be implemented using a differencing component 424. In an implementation, a delay 426 may be required to synchronize the time spent in the ICI calculation process (i.e., deriving of the ICI 420) with the processing of the received OFDM sub-carriers 422. For example, the delay 426 may be used to compensate for the delay created by the filtering in the anti-symmetric filter 414.

In an implementation, the anti-symmetric 414 includes a 21-tap finite impulse response digital filter. The coefficient of the center tap of this filter may be zero while the other taps may be anti-symmetric, i.e., a coefficient to the right of the center tap may be the negative value of the corresponding coefficient to the left of the center tap. For example, for a particular $n^{th}$ sub-carrier, only the nearest carriers to the left and to the right of the $n^{th}$ sub-carrier may be considered. In this example, the nearest sub-carriers may include the (n+1, n+2, . . . n+10) sub-carriers to the right, and the (n−1, n−2, . . . n−10) sub-carriers to the left of the $n^{th}$ sub-carrier. In certain implementations, the effect of the sub-carriers beyond (n+10) or (n−10) sub-carriers are diminishing. In other words, the contribution of the sub-carriers beyond (n+10) or (n−10) sub-carriers may not be taken into account because of impracticality in estimating channel error.

FIG. 5 is a block diagram 500 that implements ICI cancellation algorithm in the OFDM receiver, in an implementation, the system 500 may include three stages in performing the ICI cancellation algorithm. A first stage may perform estimation of transmitted data carriers by first eliminating ICI of known pilot carriers. A second stage may calculate the estimated transmitted signals more accurately by eliminating ICI of the estimated data carriers from the first stage. A third stage may provide final calculation of the transmitted data carriers after re-correction and reconstruction of the signals using a feedback from the FEC module 214. In an implementation, the first stage may include an ICI cancellation component 216-2 that receives three inputs: a) pilot carriers 502, b) data carriers 422 (i.e., OFDM sub-carriers), and c) derivative of the frequency response (H') 410. The first stage may include the cancellation of the ICI due to known carriers or the carriers known as the pilot carriers 502. For example, the data carriers 422 may be set to zero in order for the ICI cancellation component 216-2 to cancel or reduce the ICI contained at the pilot carriers 502. In this example, the ICI cancellation component 216-2 may provide an output that is ICI free with regard to the pilot carriers 502. The ICI cancellation component 216-2 may perform the ICI cancellation as discussed in FIG. 4B. In other words, the pilot carriers 502 are multiplied with the H' 410 before inputting the product to the anti-symmetric component 414. The ICI 420 in FIG. 4B may produce the calculated ICI for the pilot carriers 502.

In an implementation, the pilot carriers 502 may include pre-determined carriers that are integrated with the data carriers 422 during transmission of data symbols. The pilot carriers 502 present in the transmitted data symbols may help the OFDM receiver to synchronize and to estimate the channel. For example, the OFDM receivers may require the pilot carriers 502 in order to obtain signal timing information from the received signal to help identify the start of the data symbol within the received signal. The data symbol may include a predetermined number of bits uniquely mapped into a waveform over a predetermined, finite interval or duration. Each possible collection of bits may be mapped to a unique signal according to the mapping or modulation strategy dictated by OFDM strategy (e.g., modulation). In certain implementations, the OFDM receiver determines when the data symbol begins within the received signal and the OFDM receiver performs additional processing to improve the quality of the received signal. In other implementations, the pilot carriers 502 may include parameters for other purposes such as performance enhancement in the received signals. In certain implementations, the pilot carriers 502 may include parameter signals that may not be accounted at the receiver side in a strict sense under all conditions; however, these pilot carriers 502 may include binary phase shift keying (BPSK) that are known to the OFDM receiver at this stage by a process of thresholding.

In an implementation, the output of the ICI cancellation component 216-2 may be ready for equalization at MMSE equalization component 218-2. For example, the MMSE equalization component 218-2 may equalize the data carriers 422 with frequency response "H" 504 (i.e., channel estimate) to get actual constellations points. In this example, the actual constellations points may include noise signals because the actual constellation points may include the initial calculation or estimation of the transmitted data carriers 422. The initial calculation may include the ICI cancellation with regard to the pilot carriers 502 only. To this end, a slicing component 506 may provide hard decisions on the actual constellation points. The hard decisions may include nearest constellation points to provide a better estimation of the transmitted data carriers 422.

At the second stage, an ICI cancellation component 216-4 may process the estimated transmitted data carriers 422 that may not contain ICI due to the pilot carriers 502. The ICI cancellation component 216-4 may again follow the operation discussed in FIG. 4B. In other words, the estimated transmitted data carriers 422 may be multiplied with H' 410 before inputting the product to the anti-symmetric 414. At the second stage, the calculated ICI 420 in FIG. 4B may include the calculated ICI due to the estimated transmitted data carriers 422. The ICI from the pilot carriers 502 has been eliminated earlier at the first stage and as such, the ICI from the pilot carriers 502 may be excluded from the second and third stages of the present implementation. After the transmitted data carriers 422 have undergone first ICI cancellation, MMSE equalization component 218-4 may again equalize the estimated transmitted data carriers 422 by the channel estimate 504 to get a new set of constellation points. Each time we get a better estimate of the constellation points may allow better ICI cancellation. In certain implementations, the channel estimate 504 may be re-estimated after the ICI cancellation at the ICI cancellation component 216-4 to improve the present algorithm. For example, a refined channel estimate 504 may serve as an input to the MMSE equalization component 218-4 in the second stage of the system 400.

In an implementation, the slicing of the equalized data carriers 422 may be performed repeatedly until a certain threshold is satisfied in order to continue forward error correcting the sliced data carriers 422. For example, quadrature amplitude modulation (QAM) constellation points may include a mean square error metric that is the basis for the threshold. In this example, if the mean square error metric is small enough to perform forward error correction at the FEC module 214, then processing at the third stage of the present implementation is pursued or performed. The mean square error may be derived by squaring the actual constellation distance to the nearest point in the QAM constellation (i.e., squaring of slicing error). The squaring of the slicing error may be averaged over the OFDM sub-carriers to obtain the value of mean square error.

Generally, the output of the MMSE equalization component 218-4 may include the output of the OFDM receiver or the demodulated data created by the demodulator 212 in FIG. 2; however, further re-correction and reconstruction of the demodulated data may be performed at the FEC module 214. In an implementation, the FEC module 214 may include de-interleaver 214-2, de-mapper 214-4, partial FEC decode 214-6, partial FEC encode 214-8, mapper 214-10, and interleaver 214-12. For example, the de-interleaver 214-2 may reorder the output of the MMSE equalization component 218-4 (i.e., demodulated data). The de-mapper 214-4 may determine the constellation points of the reordered output and map the constellation points into bits. In this example, the de-mapping may include computing Log-Likelihood-Ratios.

In an implementation, the partial FEC decode 214-6 may include partial FEC decoding to avoid delay in several stages contained in a full FEC decode (e.g., full FEC decode 508). The minimized delay in the FEC module 214 may be compensated by delay 510, which includes a minimized hardware to implement the compensating delay. In other implementations, the partial FEC decode 214-6 may use and optimize the full FEC decode 508 to perform partial FEC decoding. In this implementation, the partial FEC decode 214-6 may use a Viterbi decoder and bypass a Reed Solomon decoder that is usually included in the Full FEC decoder 508. By bypassing the Reed Solomon decoder in the Full FEC decoder 508, the partial FEC decode 214-6 may avoid unnecessary delay. In an implementation, the term "partial" may include the extent of an algorithm parameter for re-correcting errors and reconstructing the signal or the demodulated data. For example, the partial FEC decode 214-6 may be employed to re-correct the errors and recreate the signal with minimal delay.

In an implementation, the FEC module 214 in DVB-T may include a concatenation of a Viterbi decoder and Reed-Solomon decoder. The FECs of second generation DTV standards may include low density parity check (LDPC) code instead of the convolutional code of DVB-T. The algorithm of the present implementation described may not be specific to any FEC module 214. Furthermore, the data carriers 422 may not pass through the Reed-Solomon decoder before being fed back to demodulator portions of the OFDM receiver. The bypassing of the Reed-Solomon decoder may be partly because of the added complexity and partly because the error rate at this point may not be sufficient to benefit from Reed-Solomon decoding. Hence, we employed the Partial-FEC decode 214-6 in the present implementation. In other implementations, the Viterbi algorithm may be replaced by a BJCR-type MAP decoder that gives soft outputs.

In an implementation, the output of the partial FEC decode 214-6 may be re-encoded and modulated by the partial FEC encode 214-8 to avoid unnecessary delay in a full FEC encode implementation. Further, the re-encoded signals may be mapped and interleaved by the mapper 214-10 and the interleaver 214-12 respectively. The mapped and interleaved signals may include the reconstructed estimates of the transmitted data carriers of the demodulated data. Further, the ICI may be computed based from the reconstructed estimates of the transmitted data carriers and the computed ICI may be removed from the demodulated data at ICI cancellation component 216-6. In an implementation, the ICI cancellation component 216-6 may include the third stage for the ICI cancellation of the now improved estimated transmitted data carriers 422. The improved estimated transmitted data carriers may result from the ICI cancellation in the first and second stages as discussed above. To this end, the ICI cancellation component 216-6 may provide more accurate signals for the calculation or estimation of the actual transmitted data carriers 422. At the third stage, an MMSE equalizer 218-6 may equalize the improved data carriers 422 with channel estimate H 504 to provide latest set of constellation points. The latest set of constellation points may provide the last stage for actual estimation of the transmitted data carriers 422. At this last stage, the actual estimation of the transmitted data carriers 422 may be de-interleaved and de-mapped by de-interleaves component 512 and the de-mapper component 220 respectively. Afterwards, the output of the de-mapper component 220 may be processed by the full FEC decode 508 to produce the MPEG 312 output. In an implementation, the delay 510 may compensate for the time consumed by the FEC processing (i.e., FEC module 214) between the second and third stages of the present implementation. For example, the delay 510 may compensate for the delay in FEC reconstruction process.

Example Process

Figure 6A:
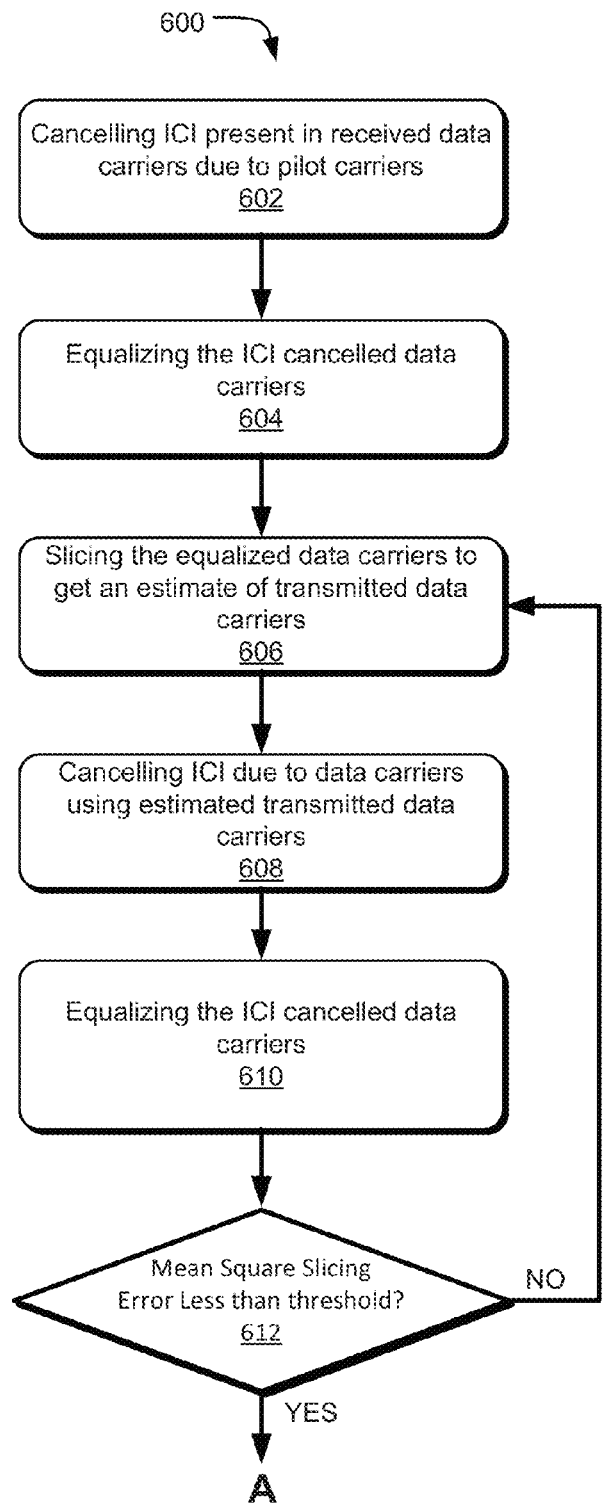
FIGS. 6A and 6B are a flow chart illustrating an example method for inter carrier interference (ICI) cancellation in the OFDM receiver.
Figure 6B:
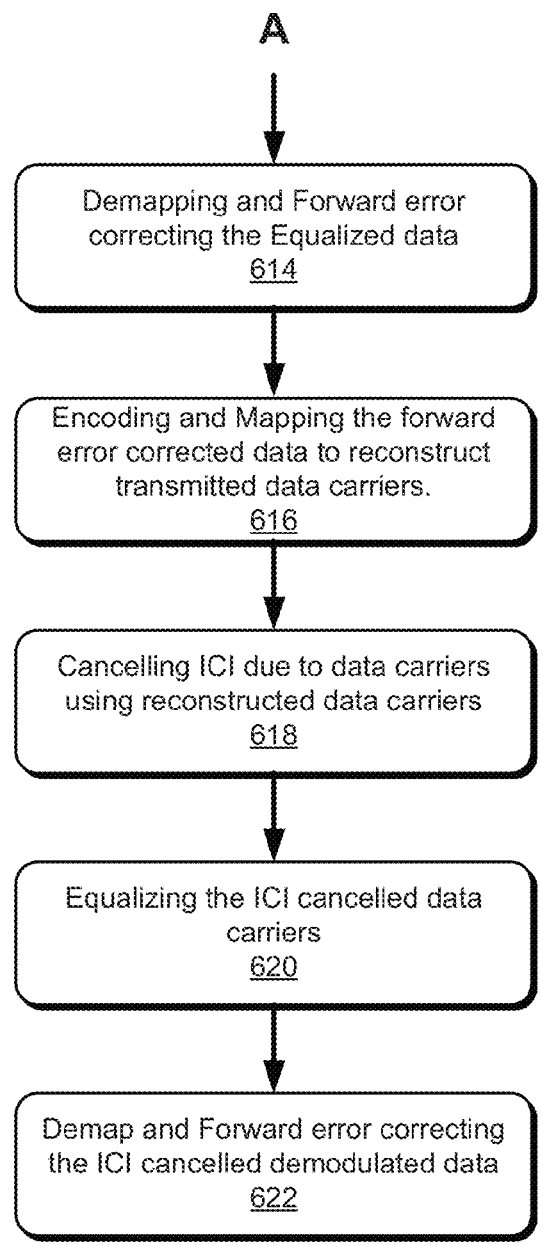

FIGS. 6A and 6B show an example process 600 for ICI cancellation in the OFDM receiver. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, cancelling ICI present in received data carriers due to pilot carriers is performed. In an implementation, a received data carrier (e.g., data carriers 422) may be set to zero in order for ICI cancellation component (e.g., ICI cancellation component 216-2) to remove the ICI created by the known pilot carriers (e.g., pilot carriers 502). The received data carriers 422 may include transmitted data carriers (e.g., OFDM sub-carriers) that contain data symbols.

At block 604, equalizing the ICI cancelled data carriers is performed. In an implementation, a MMSE equalizer (e.g., MMSE equalizer 218-2) may equalize the ICI cancelled data carriers to obtain actual constellation points of the ICI cancelled data carriers.

At block 606, slicing the equalized data carriers is performed. In an implementation, a slicing component (e.g., slicing 506) may make hard decisions on the actual constellation points to provide a good estimate of the transmitted data carriers.

At block 608, cancelling the ICI from received data carriers due to data carriers using the sliced data carriers is performed. In an implementation, a second stage includes a second ICI cancellation component (e.g., ICI cancellation component 216-4). For example, the ICI cancellation component 216-4 may remove from the data carriers the ICI computed from the estimated transmitted data carrier at the output of the slicing component 506. In other implementations, the frequency response (e.g. H 504) may be re-computed to obtain a refined frequency response estimate to be used in the second stage.

At block 610, equalizing of the ICI cancelled data carriers is performed. In an implementation, the second stage may include a second MMSE equalizer (e.g., MMSE equalizer 218-4) that may equalize the ICI cancelled data carriers (e.g., data carriers 422) to create a new set of actual constellation points. In other implementations, the second MMSE equalizer (e.g., MMSE equalizer 218-4) may equalize the estimated transmitted data carriers (e.g., data carriers 422) using the re-estimated channel estimate to get the new set of actual constellation points. The new set of actual constellation points may include the demodulated data.

If condition on block 612 is not true, then following a "NO" branch of the block 612, may repeat the process beginning at block 606. In an implementation, the slicing of the equalized data carriers may be repeated until a mean square error metric satisfies a threshold value for forward error correcting. For example, the mean square error metric with respect to a QAM constellation may include a small value compared to the threshold value in order to continue with the forward error correcting process. If condition at block 612 is determined to be true, then following the "YES" branch of block 612, at block 614 (of FIG. 6B) the demodulated data may be forward error corrected by the FEC module 214. In an implementation, a partial FEC decode (e.g., partial FEC decode 214-6) may be implemented to avoid delay in a full FEC decode (e.g., Full FEC decode 508) implementation.

At block 616, encoding and modulating the forward error corrected demodulated data is performed. In an implementation, an encoder (e.g., partial FEC encode 214-8) may provide reconstructed estimates of the transmitted data carriers of the demodulated data.

At block 618, cancelling ICI of the demodulated data due to the ICI in the reconstructed estimates of the transmitted data carriers is performed. In an implementation, a third stage of the ICI cancellation process may include a third ICI cancellation component (e.g., ICI cancellation component 216-6) to cancel the ICI due to data carriers present at the received data carriers using reconstructed estimates of data carriers as data carriers. The third stage of the ICI cancellation process may include the last stage for the ICI reduction or cancellation after signal re-correction and reconstruction at the FEC module 214. In other implementations, the third stage of ICI cancellation may be repeated to provide another estimate of the transmitted data carriers.

At block 620, equalizing of the ICI cancelled demodulated data is performed. In an implementation, the third stage may include a third MMSE equalizer (e.g., MMSE equalizer 218-6) that may equalize the estimated transmitted data carriers (e.g., data carriers 422) with a channel estimate (e.g., H 504) to obtain latest set of actual constellation points. The latest set of actual constellation points may provide the most accurate estimation for the transmitted data carriers 422. In other words, the last stage may include ICI free transmitted data carriers 422. In other implementations, the third stage may be repeated to provide another set of actual constellation points.

At block 622, forward error correcting the ICI cancelled demodulated data is performed. In an implementation, the full FEC decode 508 may be implemented to perform one last stage of forward error correction in the ICI cancelled demodulated data.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A method of inter-carrier-interference (ICI) cancellation in an orthogonal frequency division multiplexing (OFDM) receiver comprising:
  receiving OFDM sub-carriers;
  performing a first ICI cancellation based on known pilot carriers of the received OFDM sub-carriers;
  slicing the received OFDM sub-carriers to generate an estimated OFDM sub-carriers
  performing a second ICI cancellation of the estimated OFDM sub-carriers;
  demodulating the estimated OFDM sub-carriers to create demodulated data;
  de-interleaving and de-mapping of the demodulated data;
  partial forward error correcting of the demodulated data to avoid delay in full error correcting;

interleaving and mapping of the partially forward error corrected demodulated data to provide reconstructed estimates of the OFDM sub-carriers;

performing a third ICI cancellation on the reconstructed estimates of the OFDM sub-carriers;

de-interleaving and de-mapping of the reconstructed estimates of the OFDM sub-carriers; and forward error correcting the de-mapped reconstructed estimates of the OFDM sub-carriers.

2. The method of claim 1, wherein the partial forward error correcting of demodulated data comprises partial forward error correction (FEC) decoding and partial FEC encoding.

3. The method of claim 1, wherein the partial forward error correction to avoid delay comprises bypassing of Reed Solomon decoder used in a full forward error correction of the de-mapped reconstructed estimates of the OFDM sub-carriers.

4. The method of claim 1 further comprising: estimating ICI of the demodulated data based on the reconstructed estimates of the OFDM sub-carriers.

5. The method of claim 4, wherein the estimating ICI includes anti-symmetric finite impulse response filtering to compute the ICI, wherein the antisymmetric filtering is implemented to include real coefficient values.

6. The method in claim 1 further comprising: equalizing the reconstructed estimates of the OFDM sub-carriers after the performing of the third ICI cancellation.

7. The method in claim 6, wherein the slicing of the OFDM sub-carriers is repeated until a threshold value for a mean square error of constellation points metric, is satisfied to perform forward error correction.

8. An orthogonal frequency division multiplexing (OFDM) receiver device comprising:

one or more processors;

a demodulator configured to the one or more processors that demodulates received OFDM sub-carriers to create demodulated data;

a forward error correction (FEC) module configured to the one or more processors to partially forward error correct the demodulated data to avoid delay in full error correcting, wherein the FEC module reconstructs an estimates of the OFDM sub-carriers of the demodulated data;

an inter-carrier-interference (ICI) cancelling component configured to perform: a first ICI cancellation based on known pilot carriers of the received OFDM sub-carriers;

a second ICI cancellation of the estimated OFDM sub-carriers; and a third ICI cancellation of reconstructed estimates of the OFDM sub-carriers;

a minimum mean square channel equalizer (MMSE) configured to the one or more processors that equalizes the reconstructed estimates of the OFDM sub-carriers after the performing of the third ICI cancellation; and a de-mapper configured to the one or more processors to demap the equalized reconstructed estimates of the OFDM sub-carriers.

9. The receiver device of claim 8 further comprising:

a slicing component configured to provide hard decisions on actual constellation points to generate the estimates of the OFDM sub-carriers.

10. The receiver device of claim 8, wherein the MMSE includes a re-estimated channel frequency response for equalizing ICI cancelled demodulated data.

11. The receiver device of claim 8, wherein the FEC module further comprises an encoder to encode and modulate the forward error corrected demodulated data to provide the reconstructed estimates of the transmitted OFDM sub-carriers.

12. The receiver device of claim 8, wherein the ICI cancelling component further comprises an anti-symmetric finite impulse response filter to compute the ICI, wherein the antisymmetric filter is implemented to include real coefficient values.

13. The receiver device of claim 8, wherein the demodulator further comprises a slicing component configured to generate nearest constellation points to provide a better estimation of the OFDM sub-carriers.

14. The receiver device of claim 13, wherein the slicing component performs repeated slicing until a threshold value for a mean square error of constellation points metric is satisfied to perform the forward error correction.

15. A non-transitory computer-readable storage medium having computer-readable instructions thereon which, when executed by a computing device, implement a method comprising:

receiving orthogonal frequency division multiplexing (OFDM) sub-carriers;

performing a first inter-carrier-interference (ICI) cancellation based on known pilot carriers of the received OFDM sub-carriers providing hard decisions on actual constellation points to generate an estimate of the OFDM sub-carriers;

performing a second ICI cancellation on the estimated OFDM sub-carriers;

demodulating the estimated OFDM sub-carriers to create demodulated data;

de-interleaving and de-mapping of the demodulated data;

partially forward error correcting the demodulated data to avoid delay in full error correcting;

interleaving and mapping of the partially forward error corrected demodulated data in order to provide reconstructed estimates of the OFDM sub-carriers;

performing a third ICI cancellation on the reconstructed estimates of the OFDM sub-carriers;

de-interleaving and de-mapping of the reconstructed estimates of the OFDM sub-carriers; and forward error correcting the de-mapped reconstructed estimates of the OFDM sub-carriers.

16. The non-transitory computer-readable storage medium of claim 15, wherein the partial forward error correcting the demodulated data comprises partial forward error correction (FEC) decoding and partial FEC encoding.

17. The non-transitory computer-readable storage medium of claim 15, wherein the partial forward error correction to avoid delay comprises bypassing of Reed Solomon decoder used in a full forward error correction of the de-mapped reconstructed estimates of the OFDM sub-carriers.

18. The non-transitory computer-readable storage medium of claim 15, wherein a new set of constellation points is generated after the second ICI cancellation.

19. The non-transitory computer-readable storage medium of claim 15 further comprising a repeated slicing until a threshold value for a mean square error of constellation points metric is satisfied to perform the forward error correction.

20. The non-transitory computer-readable storage medium of claim 15 further comprising estimating ICI of the demodulated data based on the reconstructed estimates of the OFDM sub-carriers.

* * * * *